United States Patent
Wu et al.

(10) Patent No.: US 11,793,388 B2
(45) Date of Patent: Oct. 24, 2023

(54) THERMOELECTRIC HEAT PUMP RECOVERY AND DISH DRYING SYSTEM FOR DOMESTIC DISHWASHER

(71) Applicant: Samsung Electronics Co., Ltd., Suwon-si (KR)

(72) Inventors: Guolian Wu, St. Joseph, MI (US); Raveendran Vaidhyanathan, Rockaway, NJ (US)

(73) Assignee: Samsung Electronics Co., Ltd., Suwon-si (KR)

( * ) Notice: Subject to any disclaimer, the term of this patent is extended or adjusted under 35 U.S.C. 154(b) by 153 days.

(21) Appl. No.: 17/075,532

(22) Filed: Oct. 20, 2020

(65) Prior Publication Data
US 2022/0117459 A1    Apr. 21, 2022

(51) Int. Cl.
*A47L 15/00* (2006.01)
*A47L 15/42* (2006.01)
*A47L 15/48* (2006.01)

(52) U.S. Cl.
CPC ....... *A47L 15/4219* (2013.01); *A47L 15/4217* (2013.01); *A47L 15/4225* (2013.01); *A47L 15/4285* (2013.01); *A47L 15/486* (2013.01)

(58) Field of Classification Search
None
See application file for complete search history.

(56) References Cited

U.S. PATENT DOCUMENTS

| | | | |
|---|---|---|---|
| 9,949,611 B1 * | 4/2018 | Gluesenkamp | ..... A47L 15/4225 |
| 2020/0163526 A1 * | 5/2020 | Yoon | ..... F24H 4/02 |

FOREIGN PATENT DOCUMENTS

| | | |
|---|---|---|
| CN | 106852673 A | 6/2017 |
| CN | 107184170 A | 9/2017 |
| JP | 2002078661 A | 3/2002 |
| JP | 4985612 B2 | 7/2012 |
| KR | 20100020788 A | 2/2010 |
| KR | 20130087847 A | 8/2013 |
| KR | 20170045480 A | 4/2017 |
| KR | 101735104 B1 | 5/2017 |

* cited by examiner

*Primary Examiner* — Rita P Adhlakha

(57) ABSTRACT

A method includes supplying, using a water supply coupled to a tub of a dishwasher, water into the tub, wherein the tub includes a sump and a sprayer; circulating, using a circulation circuit coupled to the sump and the sprayer, the water from a sump to the sprayer; storing, using a water tank coupled to the circulation circuit, the circulated water from the circulation circuit on completion of a first phase; drawing heat, using a supply side of a thermoelectric module system coupled to the circulation circuit and the water tank, from the stored water in the water tank from the first phase; and outputting, using an output side of the thermoelectric module system, heat to the circulated water in the circulation circuit for a second phase.

20 Claims, 15 Drawing Sheets

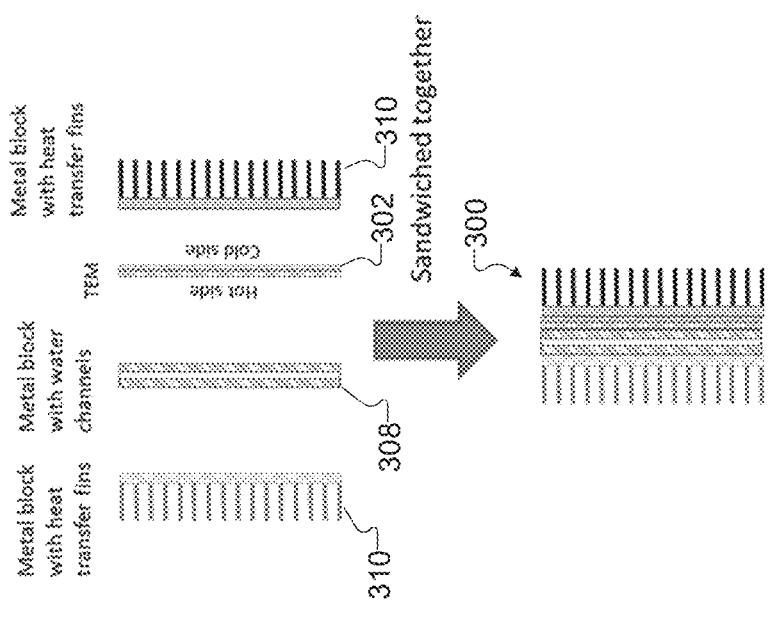
FIG. 3D
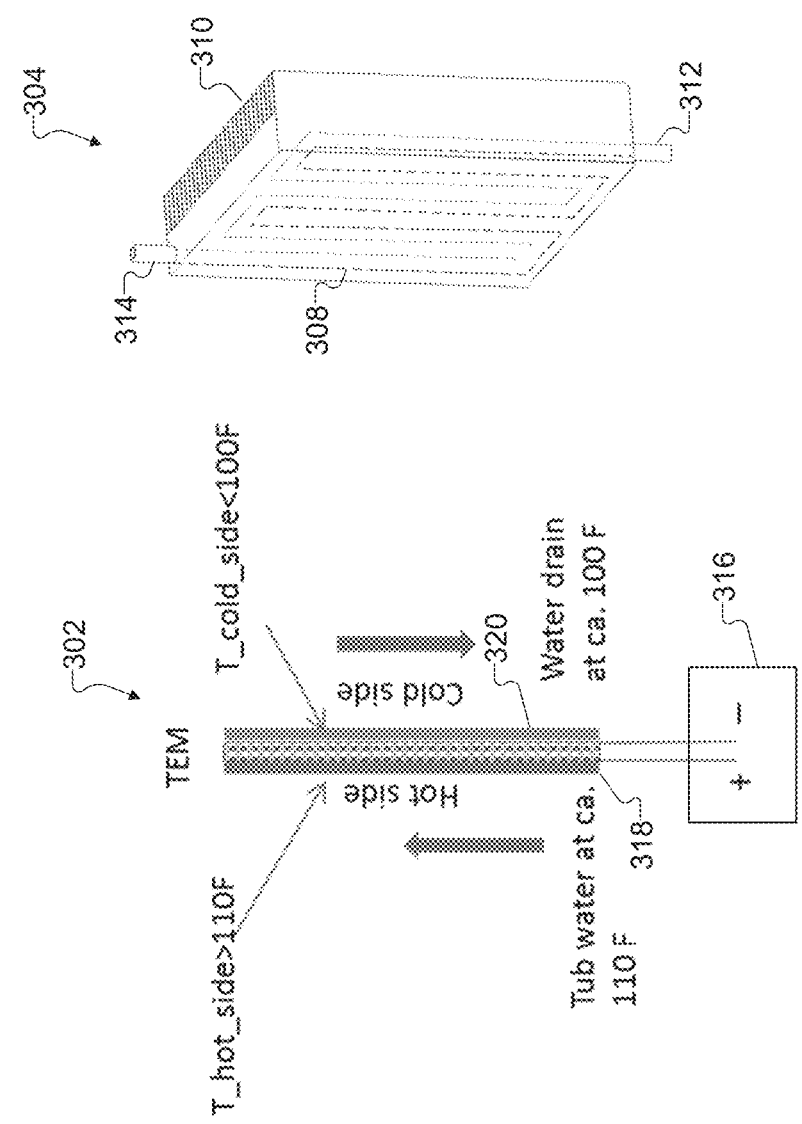
FIG. 3C
FIG. 3B

THERMOELECTRIC HEAT PUMP RECOVERY AND DISH DRYING SYSTEM FOR DOMESTIC DISHWASHER

TECHNICAL FIELD

This disclosure relates generally to dishwashers. More specifically, this disclosure relates to a thermoelectric heat pump recovery and dish drying system for a domestic dishwasher.

BACKGROUND

Conventional dishwasher appliances consume about 300 kilowatt-hours (kWh) per year. About a half of this energy is spent on reheating the water from the domestic hot water supply to a temperature that is best suitable for dish washing. Solutions are needed for reducing energy usage.

SUMMARY

This disclosure relates to a thermoelectric heat pump recovery and dish drying system for a domestic dishwasher.

In a first embodiment, a dishwasher includes a tub, a water supply, a circulation circuit, a water tank, and a thermoelectric module system. The tub including a sump and a sprayer. The water supply coupled to the tub to supply water into the tub during each phase. The circulation circuit coupled to the sump and the sprayer to circulate the water from the sump to the sprayer. The water tank coupled to the circulation circuit to store the water on completion of a first phase. The thermoelectric module system coupled to the circulation circuit and water tank, the thermoelectric module system including a thermoelectric module structured with a supply side and an output side. The supply side coupled to the water tank to draw heat from the stored water in the water tank from the first phase. The output side coupled to the circulation circuit to output heat to the circulated water in the circulation circuit for a second phase.

In a second embodiment, a method includes supplying, using a water supply coupled to a tub of a dishwasher, water into the tub, wherein the tub includes a sump and a sprayer; circulating, using a circulation circuit coupled to the sump and the sprayer, the water from a sump to the sprayer; storing, using a water tank coupled to the circulation circuit, the circulated water from the circulation circuit on completion of a first phase; drawing heat, using a supply side of a thermoelectric module system coupled to the circulation circuit and the water tank, from the stored water in the water tank from the first phase; and outputting, using an output side of the thermoelectric module system, heat to the circulated water in the circulation circuit for a second phase.

In a third embodiment, a dishwasher includes a tub, a water supply, a circulation circuit, a water tank, and a compression heat pump system. The tub including a sump and a sprayer. The water supply coupled to the tub to supply water into the tub during each phase. The circulation circuit coupled to the sump and the sprayer to circulate the water from the sump to the sprayer. The water tank coupled to the circulation circuit to store the water on completion of a first phase. The compression heat pump system coupled to the circulation circuit and water tank, the compression heat pump system including a supply heat exchange, a compressor, and an output heat exchange. The supply heat exchange coupled to a compressor fluid circuit and the water tank to draw heat from the stored water in the water tank from the first phase into a fluid in a compression fluid circuit. The compressor coupled to the compressor fluid circuit to compress the fluid received from the supply heat exchange. The output heat exchange coupled to the compressor fluid circuit and the circulation circuit to output heat from the compressed fluid to the circulated water in the circulation circuit for a second phase.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMID), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts:

FIGS. 3A, 3B, 3C and 3D illustrate an example thermoelectric module system in accordance with this disclosure;

DETAILED DESCRIPTION

FIGS. 1 through 12B, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, A typical dishwasher consumes about 300 kWh per year. About a half of this energy is spent on reheating the water from the domestic hot water supply to a temperature that is best suitable for dish washing. A dishwasher cycle consists of four sequences: a pre-wash phase, a main wash phase, a rinse phase, and a drying phase.

This disclosure provides various techniques for a thermoelectric heat pump recovery and dish drying system for a domestic dishwasher. As described in more detail below, a thermoelectric module (TEM) can be implemented into a dishwasher for heating water for each phase.

Figure 1:
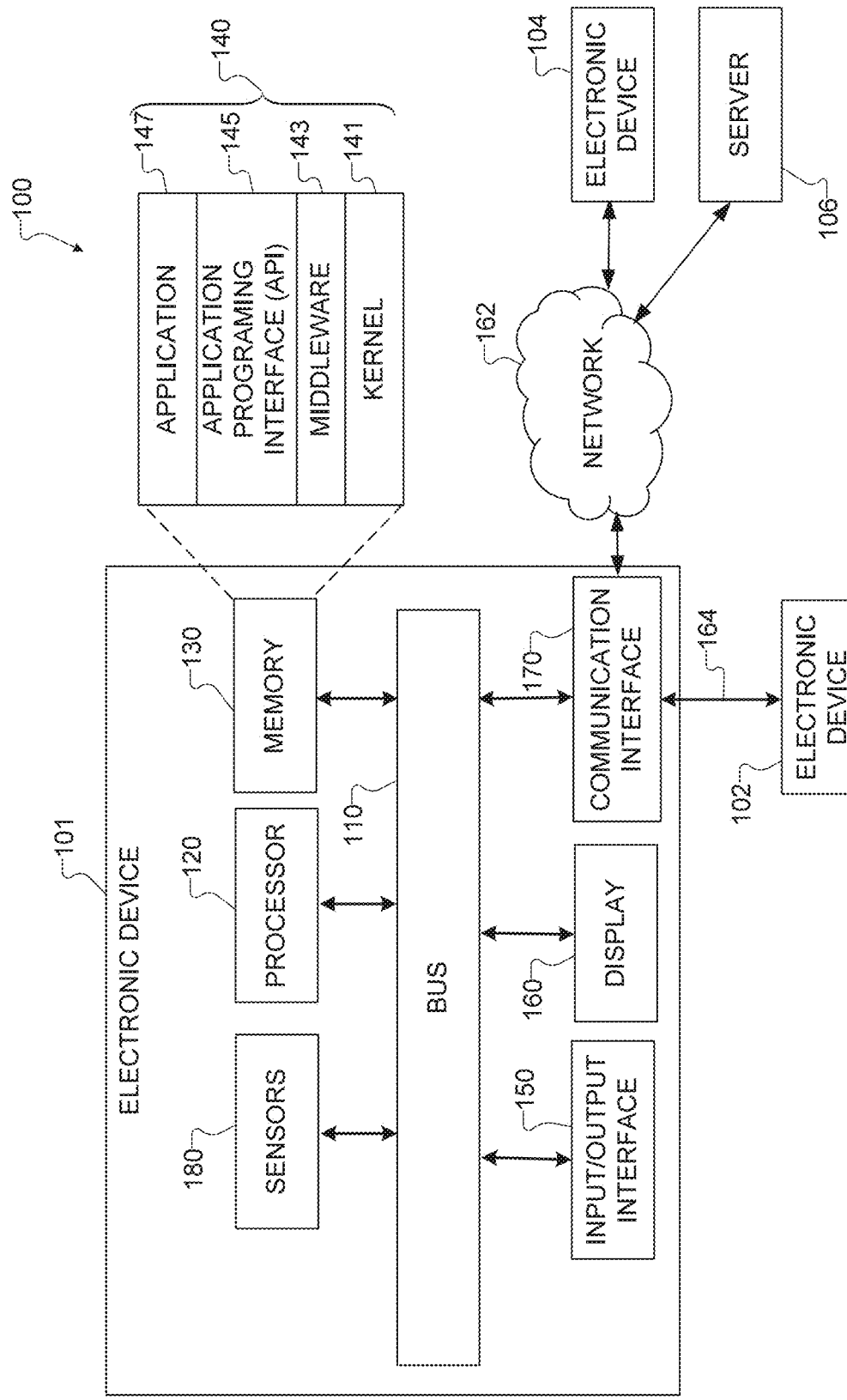
FIG. 1 illustrates an example network configuration including an electronic device in accordance with this disclosure.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. As described in more detail below, the processor 120 can control the TEM, pumps, and valves in a dishwasher.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 includes one or more applications for controlling a TEM, fluid pumps, and valves in a dishwasher as discussed below. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first external electronic device 102, a second external electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 include temperature sensors and humidity sensors for detecting a temperature and humidity of a dishwasher. The sensor(s) 180 can also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a biophysical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. In some embodiments, the server 106 can transmit signals to the dishwasher for controlling the TEM throughout the four phases.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
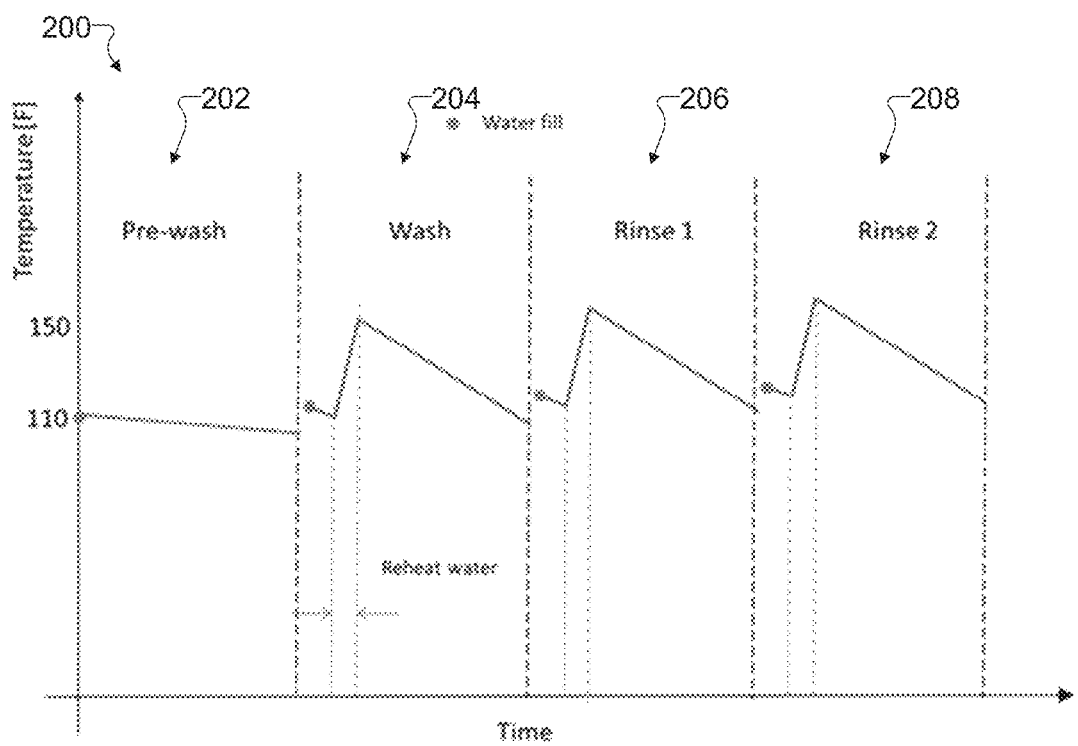
FIG. 2 illustrates an example diagram of the water temperature changes for a sample dishwasher cycle including a prewash phase, a main wash phase, a first rinse phase, and a second rinse phase in accordance with this disclosure.

FIG. 2 illustrates an example diagram of the water temperature changes 200 for a sample dishwasher cycle including a prewash phase 202, a main wash phase 204, a first rinse phase 206, and a second rinse phase 208 in accordance with this disclosure. Although the water temperature changes 200 illustrated in FIG. 2 may be described as being used by the electronic device 101 of FIG. 1, the water temperature changes may be used with any suitable electronic device and in any suitable system without departing from the present disclosure.

At the beginning of prewash phase 202, water fills into a dishwasher tub from a hot water supply at a temperature around 110° F. The water temperature drops slightly in the process due to the colder temperature of wash tub. At the end of this sequence, the water temperature drops to around 100° F. Water is then pumped out of the wash tub by a drain pump. Subsequently, the main wash phase 204 starts. An internal heater within the dishwasher is selectively turned on during the different sequences within the cycle to heat the water to higher temperature during each sequence to about 150° F. At the end of the main wash phase 204, the water temperature drops to around 100° F. and is then pump out of the wash tub by a drain pump. The main wash phase 204 for heating water can also be repeated for the first rinse phase 206 and the second rinse phase 208.

Although FIG. 2 illustrates one example diagram of the water temperature changes 200 for a sample dishwasher cycle including a prewash phase 202, a main wash phase 204, a first rinse phase 206, and a second rinse phase 208, various changes may be made to FIG. 2. For example, the water temperature changes 200 may include more phases or repeat any of phases 202-208. Also, the water temperature changes 200 may involve the use of more than the same heating patterns or different heating patterns for each of the phases 202-208.

Figure 3A:
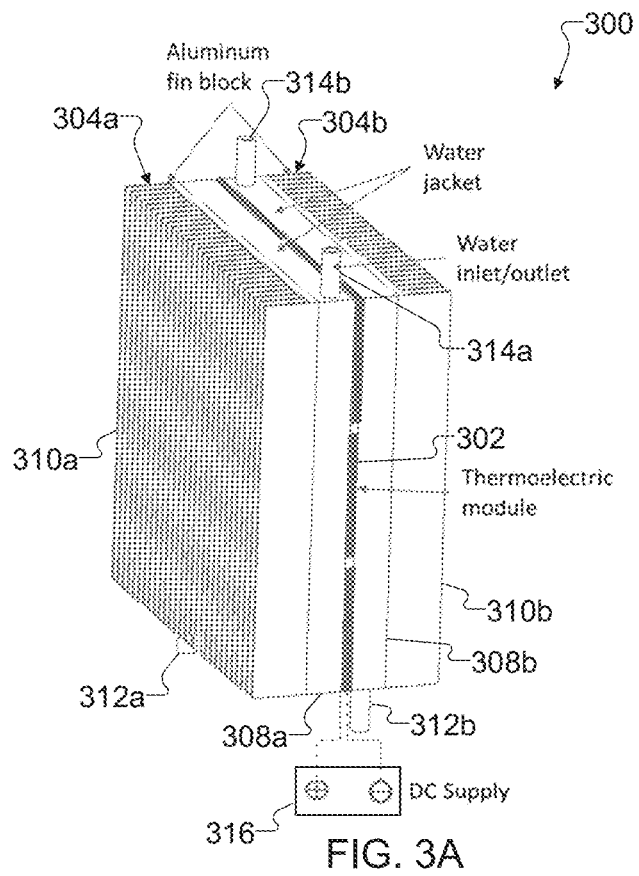

FIGS. 3A, 3B, 3C and 3D illustrate an example thermoelectric heat pump system 300 in accordance with this disclosure. In particular, FIG. 3A illustrates an example thermoelectric heat pump system 300, FIG. 3B illustrates an example TEM 302, and FIG. 3C illustrates an example heat transfer block 304, and FIG. 3D illustrates an example approach 306 for designing a thermoelectric heat pump system 300. Although the thermoelectric heat pump system 300 may be described as being controlled using the electronic device 101 of FIG. 1, the thermoelectric heat pump system 300 may be controlled with any suitable electronic device and be included in any suitable system without departing from the present disclosure.

FIG. 3A illustrates a thermoelectric heat pump system 300 for transferring heat from water used in a prior phase for heating water used in a current phase. The thermoelectric heat pump system 300 can include a TEM 302, an output heat transfer block 304a including an output water channel 308a and output heat transfer fins 310a, a supply heat transfer block 304b including a supply water channel 308b and supply heat transfer fins 310b, output inlet 312a, supply inlet 312b, output outlet 314a, supply outlet 314b, and power supply 316.

The TEM 302 transfers energy from one side to the other. A TEM 302 illustrated in FIG. 3B in greater detail. The TEM 302 can transfer heat from a supply side 320 to an output side 318 when energy is applied from a power source 316. If the poles of the power source 416 are reversed, the supply side 320 and output side 318 are also reversed. The TEM 302 can draw heat from a supply side 320 and output the heat to the output side 318.

A heat transfer block 304, as shown in FIG. 3C, is used to assist in drawing or outputting heat from different types of fluids by the TEM 302. The heat transfer block 304 includes a water channel 308, heat transfer fins 310, an inlet 312, and an outlet 314. The heat transfer block 304 can be placed on a supply side 320 of the TEM 302 as a supply heat transfer block 304b including a supply water channel 308b, supply heat transfer fins 310b, a supply inlet 312b, and a supply outlet 314b, and can be placed on an output side 318 of the TEM 302 as a output heat transfer block 304a including an output water channel 308a, output heat transfer fins 310a, an output inlet 312a, and an output outlet 314a.

The water channel 308 can be structured to wind back and forth in the heat transfer block 304 to maximize the heat transfer with the fluid. Fluid enters the water channel 380 at the inlet 312 and exits at the outlet 314. The part of the heat transfer block 304 with the water channel 308 is attached to the TEM 302.

The heat transfer fins 310 extend from the part of the heat transfer block 304 away from the TEM 302. The heat transfer fins 310 can extend horizontally or vertically. The heat transfer fins 310 can be used in an air passage or a water tank. The heat transfer fins 310 can be used in a combination water tank and air passage. The heat transfer fins 310 can aid in the transfer of heat in the fluids exposed to the fins.

FIG. 3D illustrates one of the possible combination of components in a thermoelectric heat pump system 300 including a TEM 302, a water channel 308 and heat transfer fins 310 on an output side 318 of the thermoelectric module 302, and heat transfer fins 310 on a supply side 320 of the TEM 302.

There is a significant amount of thermal energy that is wasted when the drain water with a temperature around 100° F. is pumped out of the tub. Directly extracting heat from the drain water by a simple heat exchanger is not possible since the water fill that comes from the hot water supply has a temperature around 110° F., which is higher than the temperature of drain water. It is possible to use a heat pump heat exchanger to extract heat from a lower temperature heat source to a higher temperature heat source. For example, such a heat exchanger can be built with thermoelectric modules (TEM) 302. The TEM 302, powered with a power supply 316 (such as a DC source), creates a temperature on the cold side, which is lower than the temperature of drain water. The TEM 302 also creates a temperature on the hot side, which is higher than the temperature of tub water. Assuming that $Q_c$ is the thermal energy extracted from the drain water, and the TEM consumes $W_{TEM}$, the thermal energy $Q_c$ that is added to the tub water is defined by equation 1.

$$Q_h = Q_c + W_{TEM} \quad (1)$$

Although FIGS. 3A, 3B, 3C and 3D illustrate an example thermoelectric module system 300, various changes may be made to FIGS. 3A, 3B, 3C and 3D. For example, each individual component of the thermoelectric module system 300 may have any suitable size, shape, and dimensions, and thermoelectric module system 300 overall may have any suitable size, shape, and dimensions. Also, while specific materials may be described above as being used in the thermoelectric module system 300, the thermoelectric module system 300 may be fabricated from any other suitable materials. In addition, the thermoelectric module system 300 may include any suitable number of each component shown here.

FIGS. 4A, 4B, 4C, and 4D illustrate example dishwashers 400-406 with a thermoelectric module system 408-414 in accordance with this disclosure. Although the dishwashers 400-406 are described as being controlled using the electronic device 101 of FIG. 1, the dishwashers 400-406 may be controlled with any suitable electronic device and be included in any suitable system without departing from the present disclosure.

Figure 4A:
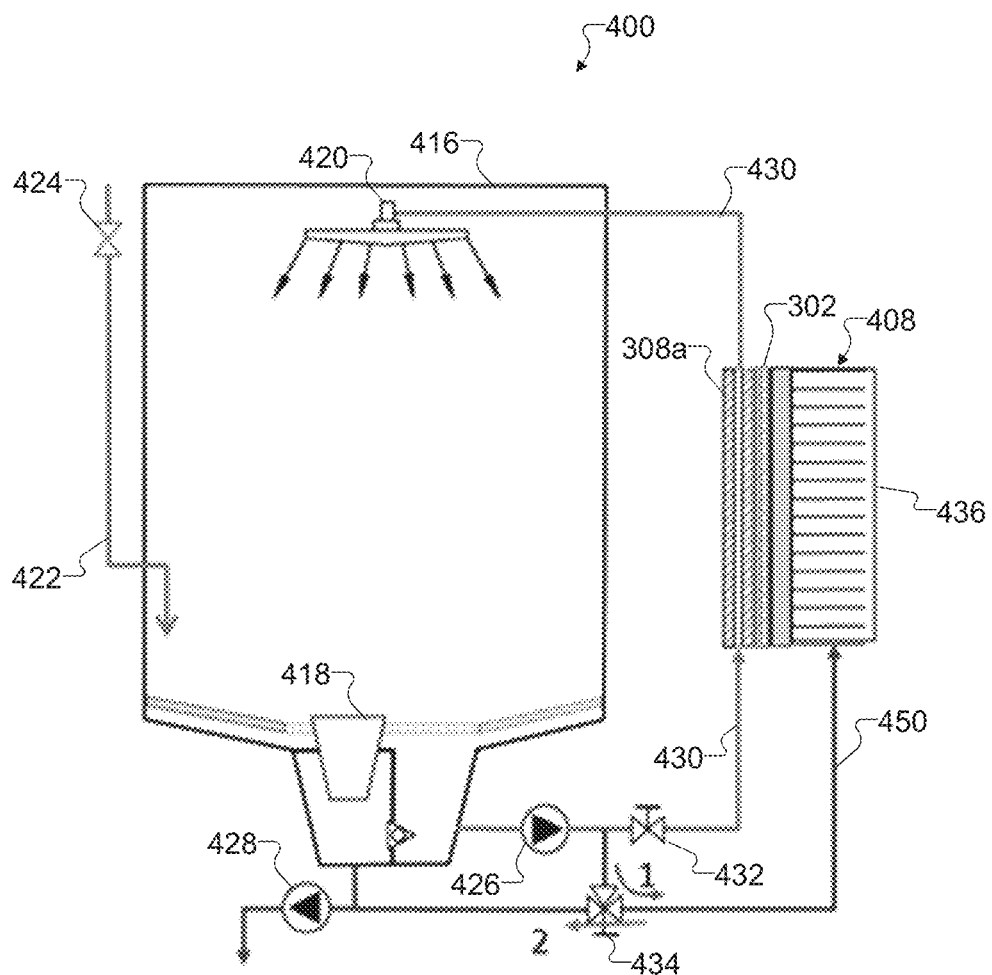
FIGS. 4A, 4B, 4C, and 4D illustrate example dishwashers with a thermoelectric module system in accordance with this disclosure.

As shown in FIG. 4A, dishwasher 400 includes a thermoelectric heat pump system 408, a tub 416, a sump 418, a sprayer 420, a water supply 422, a water supply valve 424, a main pump 426, a drain pump 428, a circulation circuit 430, a main valve 432, a drain valve 434, and a recirculation circuit 450.

The tub 416 is a main unit of the dishwasher 400. Dishware can be placed inside the tub 416 for cleaning. The tub 416 is structured to retain water unless added through the water supply 422, drained in the sump 418, or dispersed by a sprayer 420.

The sump 418 is a pump used to remove water from the tub 416. The sump 418 is located at the lowest portion of the tub 416, which can be offset from a center for the bottom of the tub 416. The sump 418 optionally drains the water from the tub towards a main pump 426 or to a drain pump 428.

The sprayer 420 is coupled to the tub 416 and located above where items in the dishwasher are stored. The dishwasher 400 can include one or more sprayers, which can be positioned as different levels. While illustrated at the top of the tub 416. The sprayer 420 can be located on the bottom or side of the tub 416 and angle toward the center of the tub 416.

The water supply 422 provides water to the tub 416. The water supply 422 can be connected to a water source outside of the dishwasher 400. The water supply 422 provide water directly into the tub 416 or through a sprayer 420.

The water supply valve 424 is coupled to the water supply 422. The water supply valve is operated to control the flow of water to the tub 416 through the water supply. The water supply valve can be partially and gradually opened in a manner to control the flow of water into the tub 416.

The main pump 426 pumps the water from the sump 418 through the circulation circuit 430. The main pump 426 is installed on the circulation circuit 430 and is controlled by the electronic device 101. The electronic device 101 can control a flow of the water through the main pump to alter the pressure of the water dispersed at the sprayer 420.

The drain pump 428 also can pump water from the dishwasher 400. For example, the drain pump 428 can pump water to an area outside of the dishwasher 400. The drain pump 428 is connected to a portion of the tub 416 where the sump 418 drains water.

The circulation circuit 430 is external to the tub 416 and extends from the sump 418 to the sprayer 420. The circulation circuit 430 is a fluid conduit that aids in circulation of the water in the tub 416. The circulation conduit 430 is coupled with the main pump 426, the main valve 432, and the output water channel 308a of the thermoelectric pump system 408.

The main valve 432 controls a flow of water from the main pump through the circulation circuit 430. The main valve 432 can alternatively be open or closed to control the flow of the water through the circulation circuit 430 to the sprayer 420. In this manner, the main valve 432 can also be controlled to alter the pressure of the sprayer.

The drain valve 434 is a three-way valve to control the direction of flow on the recirculation circuit 450. The drain valve 434 is opened based on current operation of the dishwasher 400. During a circulation or operation phase, the drain valve 434 and the main valve 432 is opened. During a tub draining phase, the main valve is closed and the drain valve 434 is controlled to make a path between the main pump 426 and the recirculation circuit 450. During a water tank draining phase, the drain valve 434 is controlled to make a path from the recirculation circuit 450 and the drain pump 428.

The recirculation circuit 450 connects the drain valve 434 to the finned fluid passage 436 as a fluid conduit. The recirculation circuit 450 is coupled to the drain valve 434 and the finned fluid passage 436.

The thermoelectric pump system 408 includes a TEM 302, an output water channel 308a, and a finned water tank 436. The output water channel 308a is coupled to an output side of the TEM 302 and coupled to the circulation circuit 430. Water from the tub is circulated through the output water channel 308a during certain washing operations of the washing machine 400.

The finned water tank 436 is attached on the supply side of the TEM 302 and coupled to the recirculation circuit 436. When a washing operation is completed, the water that was circulated during the washing operation is directed into the finned water tank 436. Once the water is fully drained from the tub 416 to the finned water tank 436, the drain valve 434 is closed to maintain the water in the finned water tank 436.

During the next washing operation, power from the power supply 316 powers the thermoelectric heat pump system 408 to draw heat from the water stored in the finned water tank 436 and supply the heat to the water being circulated in the output water channel 308a.

After the heat is fully recovered, the finned water tank 436 is drained through the recirculation circuit 450. A washing operation can be fully completed or continue without requiring additional heating for the finned water tank 436 to be drained.

Figure 4B:
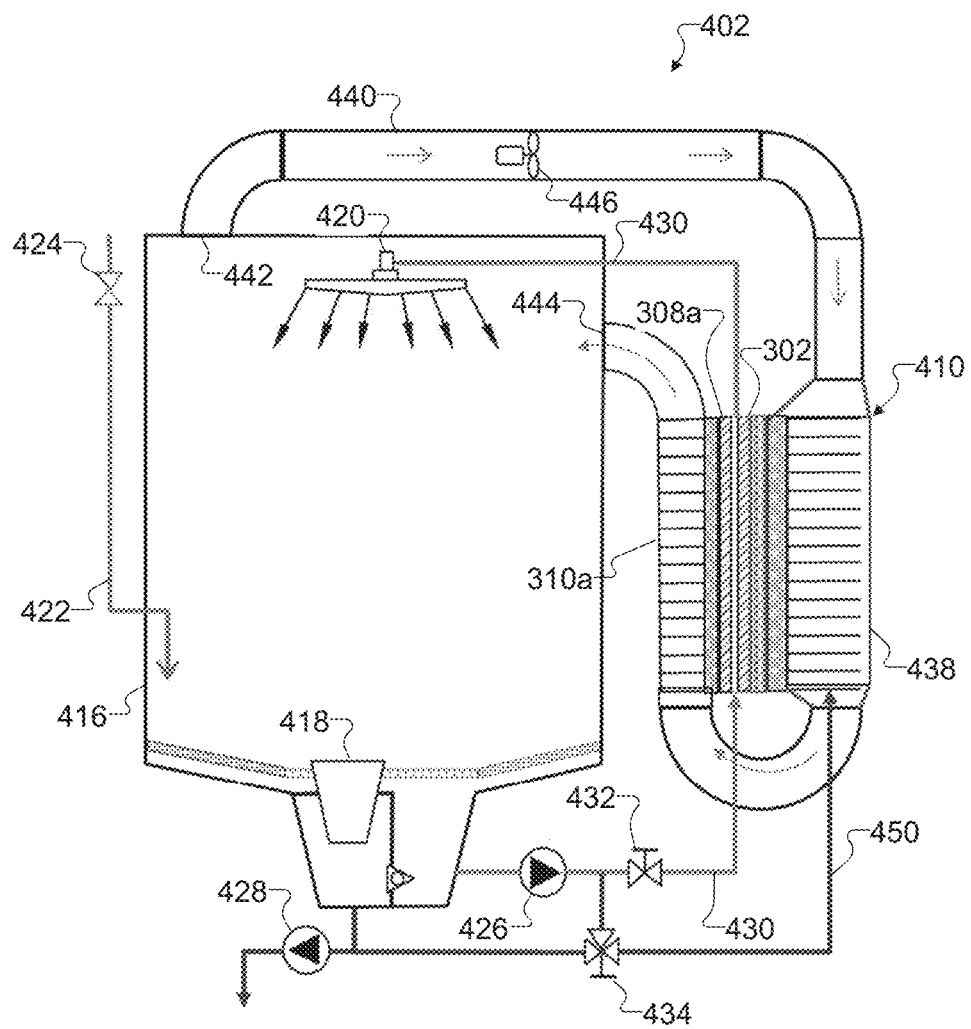

As shown in FIG. 4B, dishwasher 402 includes a thermoelectric heat pump system 410, a tub 416, a sump 418, a sprayer 420, a water supply 422, a water supply valve 424, a main pump 426, a drain pump 428, a circulation circuit 430, a main valve 432, a drain valve 434, a dehumidifying circuit 440, a fan 446, and a recirculation circuit 450.

The dehumidifying circuit 440 is external to the tub 416 and extends from the air outlet 442 to the air inlet 444. The dehumidifying circuit 430 is a fluid conduit that aids in circulation of the air in the tub 416 during a drying phase. The dehumidifying conduit 430 is coupled with the fan 446, the supply finned fluid passage 438, the output heat transfer fins 310a.

The fan 446 is located in and coupled to the dehumidifying circuit 440. The fan forces air through the dehumidifying circuit 440 when operated during the drying phase.

The thermoelectric heat pump system 410 includes a TEM 302, an output water channel 308a, output heat transfer fins 310a, and a finned fluid passage 438. The output water channel 308a and the finned fluid passage 438 operate similarly to the water channel 308a and the finned water tank 436 in dishwasher 400 during washing operations.

During a drying operation, the fan 446 is operated to draw air out of the tub 416 through the air outlet 442 to the finned fluid passage 438. The TEM 302 draws heat from the air, effectively dehumidifying the air. The condensed water can be drained through the recirculation circuit 450. The air passes through the finned fluid passage 438 to the output heat transfer fins 310a. The TEM 302 supplies the heat drawn out of the finned fluid passage 438 to the air passing through the output heat transfer fins 310a. The heated air pass through the dehumidifying circuit 430 to the air inlet 444 of the tub 416.

Figure 4C:
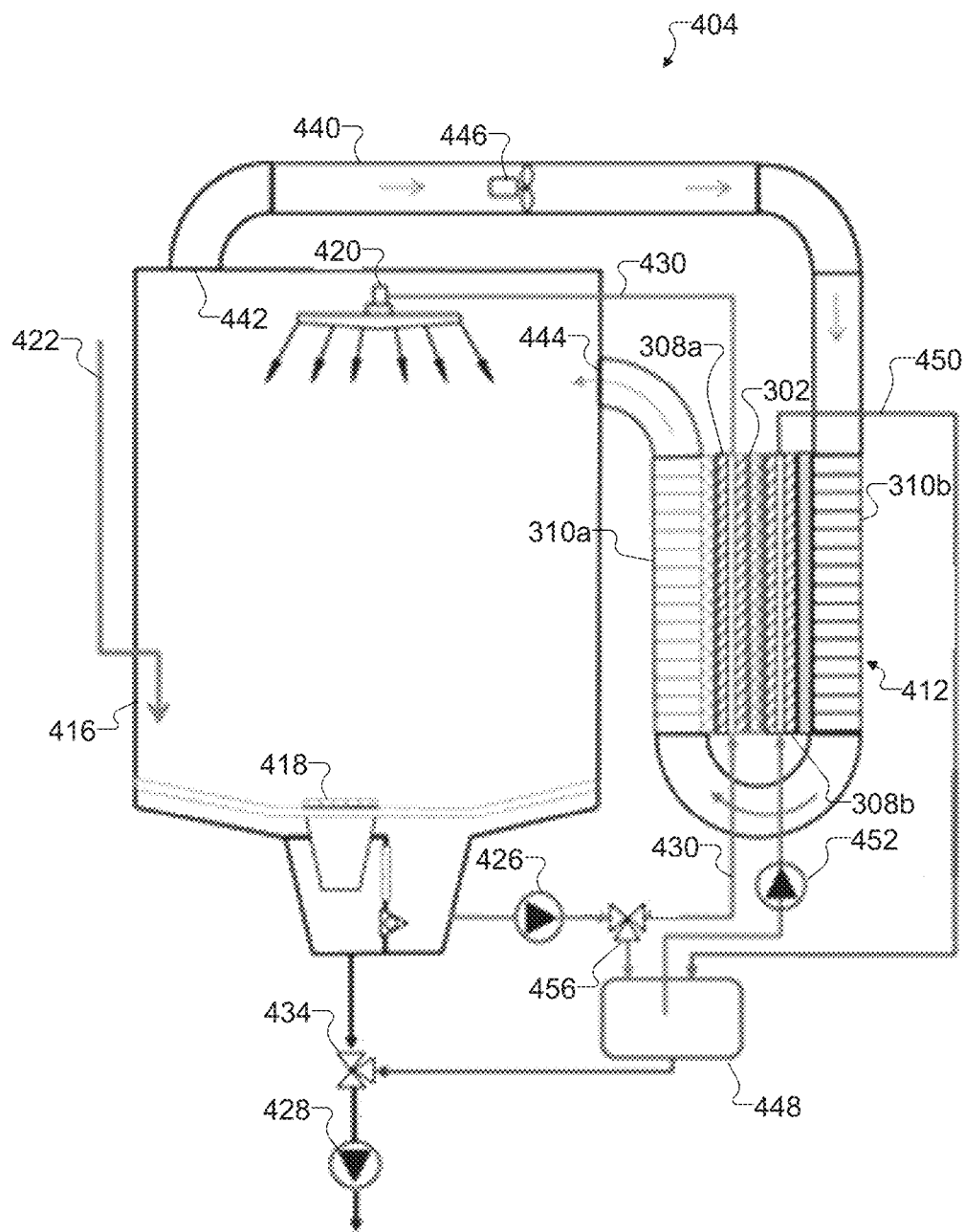

As shown in FIG. 4C, dishwasher 404 includes a thermoelectric heat pump system 412, a tub 416, a sump 418, a sprayer 420, a water supply 422, a water supply valve 424, a main pump 426, a drain pump 428, a circulation circuit 430, a main valve 456, a drain valve 434, a dehumidifying circuit 440, a fan 446, water tank 448, a recirculation circuit 450, and recirculation pump 452.

The main valve 456 is a three-way valve coupled to the circulation circuit 430 and the water tank 448. The main valve 456 directed the flow of water from the main pump 426, either through the circulation circuit 430 or to the water tank 448. During a washing operation the main valve is opened to direct the water through the circulation circuit 430. When a washing operation has completed, the main valve 456 is opened to direct the water to the water tank.

The water tank 448 stores water used in washing operation that has completed. The water tank is coupled to the drain valve 434, the main valve 456, the recirculation circuit 450. The water tank 448 is filled with water after a washing operation has completed. During the following heat recovery operation, the water in the water tank 448 flows through the recirculation pump 452. After the heat recovery operation is completed, the water in the water tank 448 is drained by the drain pump 428.

The recirculation pump 452 operates to circulate water through the recirculation circuit 450. The recirculation pump 452 can be installed on the recirculation circuit 450 between the water tank 448 and the thermoelectric heat pump system 412.

The thermoelectric heat pump system 412 includes a TEM 302, an output water channel 308a, a supply water channel 308b, output heat transfer fins 310a, and supply heat transfer fins 310b. The thermoelectric heat pump system 412 uses the supply water channel 308b to draw heat from the water flowing through the recirculation circuit 450.

Figure 4D:
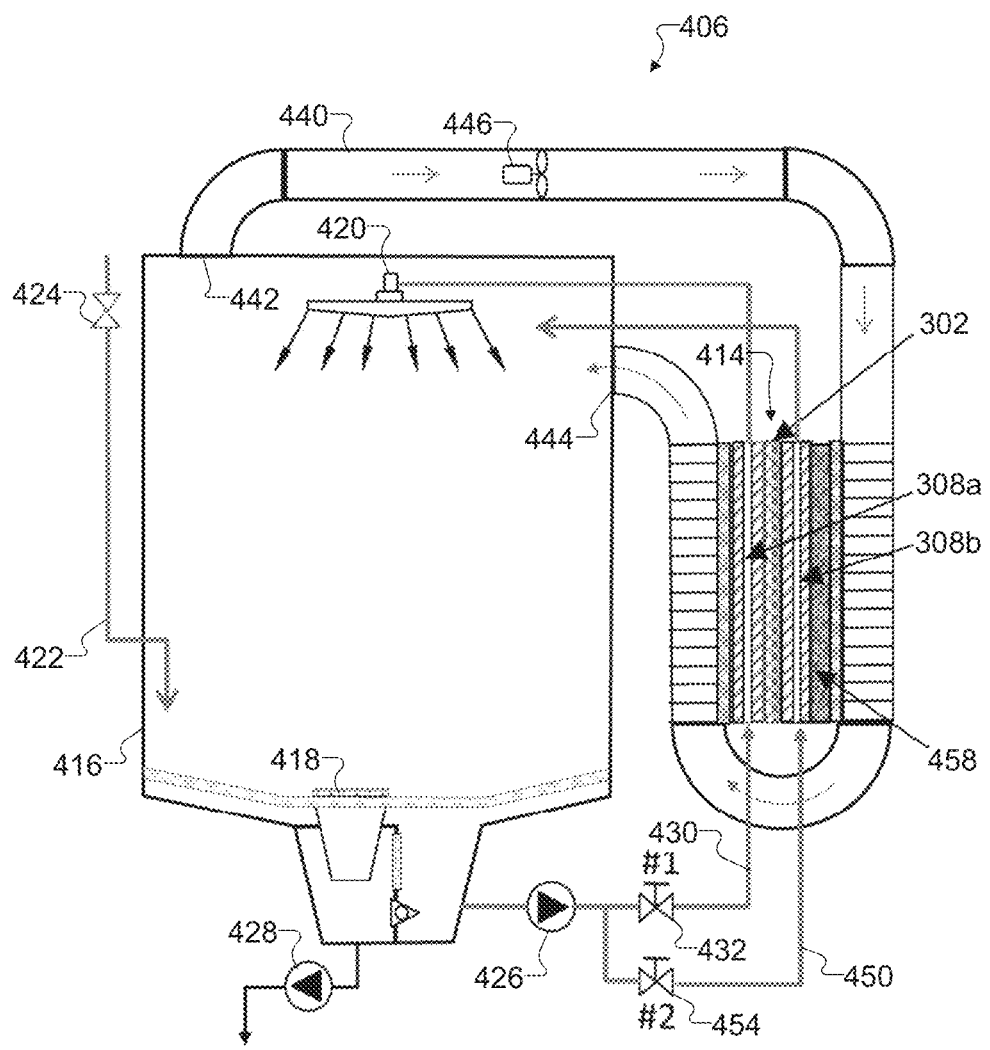

As shown in FIG. 4D, dishwasher 406 includes a thermoelectric heat pump system 414, a tub 416, a sump 418, a sprayer 420, a water supply 422, a water supply valve 424, a main pump 426, a drain pump 428, a circulation circuit 430, a main valve 432, a dehumidifying circuit 440, a fan 446, a recirculation circuit 450, and a recirculation valve 454.

The recirculation valve 454 is coupled to the recirculation circuit 450. The recirculation valve 454 controls the flow of water from the main pump 426 into the recirculation circuit 450. After a washing operation is completed, the main valve 432 is closed and recirculation valve 454 is opened. In this manner, the main pump 426 can alternatively pass water through the circulation circuit 430 or the recirculation circuit 450.

The thermoelectric heat pump system 414 includes a TEM 302, an output water channel 308a, a supply water channel 308b, output heat transfer fins 310a, supply heat transfer fins 310b and thermal storage material 458. The water is cycled through the output water channel 308a during a washing operation. The TEM 302 is operating during washing operation and transferring heat from the thermal storage material 458 to the water flowing through the output water channel 308a. When washing operation is completed, the main valve 432 shuts off and the recirculation valve 454 opens up. The water circulates through the supply water channel 308b, transferring heat from the water to the thermal storage material 458. When the temperature of the water drops to a certain level, the main pump 426 stops and the recirculation valve 454 closes off. The drain pump 428 kicks on to drain water from the washing tub 416. The heat is stored and converted by the thermal storage material 458. The thermal storage material 458 can form the structure for the supply water channel 308b or can be coupled on the outsides for each of the channels.

Although FIGS. 4A, 4B, 4C, and 4D illustrate example dishwashers 400-406 with a thermoelectric module system 408-414, various changes may be made to FIGS. 4A, 4B, 4C and 4D. For example, each individual component of the dishwashers 400-406 may have any suitable size, shape, and dimensions, and dishwashers 400-406 overall may have any suitable size, shape, and dimensions. Also, while specific materials may be described above as being used in the components of dishwashers 400-406, the components of dishwashers 400-406 may be fabricated from any other suitable materials. In addition, the dishwashers 400-406 may include any suitable number of each component shown here.

Figure 5:
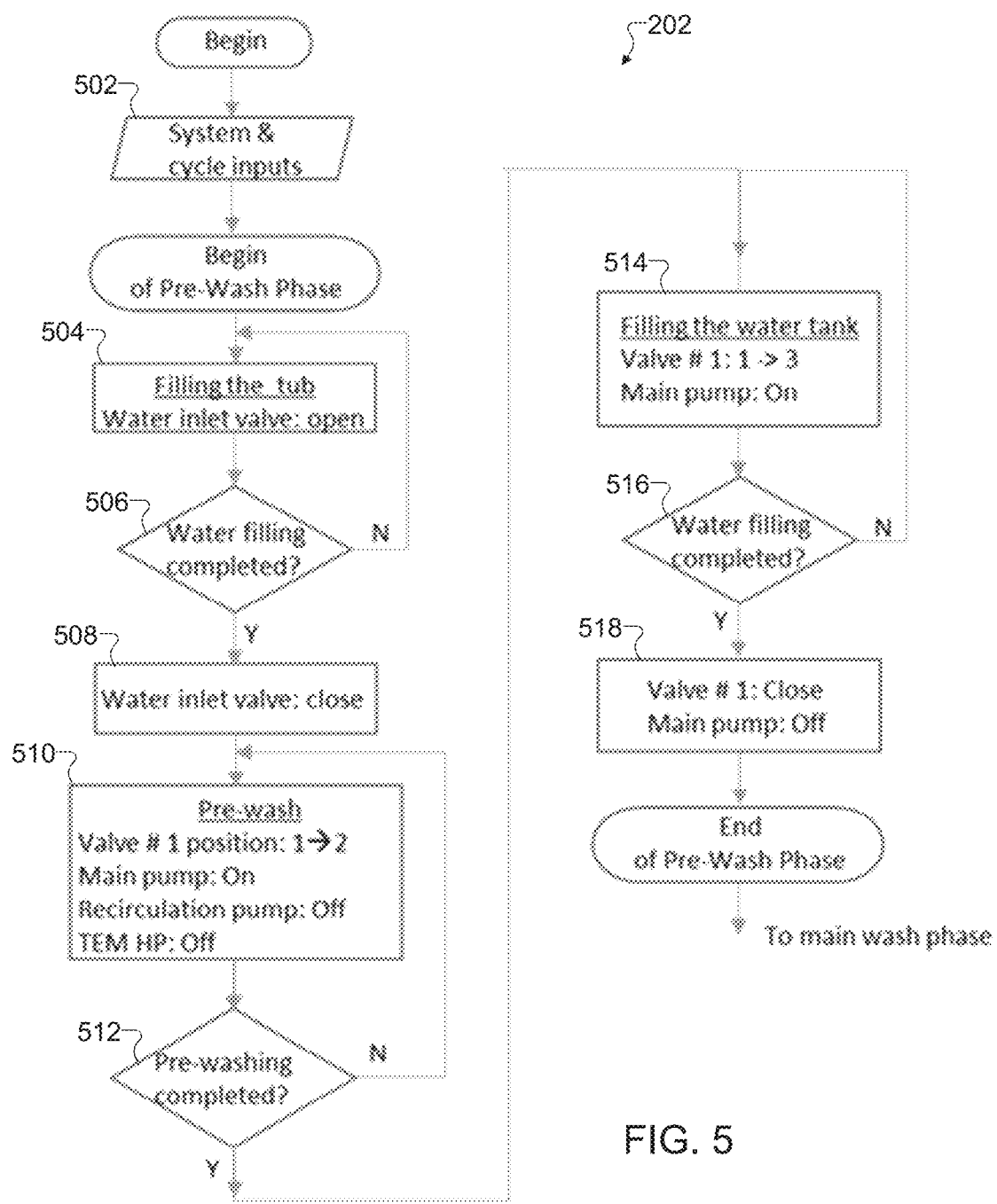
FIG. 5 illustrates an example flow chart for a prewash phase in accordance with this disclosure.

FIG. 5 illustrates an example flow chart for a prewash phase 202 in accordance with this disclosure. Although the prewash phase 202 shown in FIG. 5 is described as being performed using the electronic device 101 shown in FIG. 1 and the dishwashers 400-406 shown in FIGS. 4A-4D, the prewash phase 202 shown in FIG. 5 could be used with any other suitable electronic device and in any suitable dishwasher system without departing from the present disclosure.

In operation 502, the electronic device 101 can receive system inputs and cycle inputs. The system inputs can include type of wash, amount of dishware in the tub, zones where dishware is detected, etc. The cycle inputs can include which phases to run, specific temperatures, pressure of the sprayer 420, etc. The electronic device 101 can begin the pre-wash phase 202 based on the system inputs 502.

In tub filling operation 504, the electronic device 101 can open the water supply valve 424 allowing water to flow through the water supply 422 into the tub 416. The water supply 422 can be connected to a standard water supply with unheated or room temperature water, which is initially provided to the tub 416.

In operation 506, the electronic device 101 can determine whether the tub filling operation 504 is completed. The determination can be based on whether tub 416 is filled with water from the water supply 422 to a suitable level for the prewash phase 202. The level of the water can be determined based on the system inputs and the cycle inputs. When the level of water is not suitable for the prewash phase 202, the electronic device 101 can return to operation 504. When the level of water is suitable for the prewash phase 202, the electronic device 101 can proceed to operation 508.

In operation 508, the electronic device 101 can close the water supply valve 424 shutting off the flow of water through the water supply 422 in the tub 416. The water supply valve 424 can be closed incrementally at different levels of water to slow the flow of water through the water supply 422 as the level of water in the tub 416 reaches a suitable level for the prewash phase 202.

In prewash operation 510, the main pump 426 operates while the recirculation pump 452 and the TEM 302 do not operate. That is, the electronic device 101 operates the main pump 426, while the recirculation pump 452 and the TEM 302 are not operated. The electronic device 101 controls the main valve 456 to direct water from the tub 416 through circulation circuit 430. The main pump 426 pumps the water drained from the sump 418 through the circulation circuit 430 towards output water channel 308a of the thermoelectric heat pump system 300. The water passes through the output water channel 308a and along to the sprayer 420. The prewash water is sprayed in the interior of the tub 416. The electronic device 101 leaves the recirculation pump 452 and the TEM 302 turned off during the prewash operation 510.

In operation 512, the electronic device 101 determines whether the prewash operation 510 is completed. The pre-wash operation 510 can be schedule based on a time of the cycle inputs. When the prewash operation 512 is completed, the electronic device 101 proceeds to water tank filling operation 514.

In water tank filling operation 514, the electronic device 101 fills the water tank 448. The electronic device 101 controls the main valve 456 to direct the water pumped by the main pump 426 from the sump 418 towards the water tank 448 and closes the path to the circulation conduit 430. The main pump 426 remains operating until the water is completely drained from the tub 416.

In operation 516, the electronic device 101 determines whether the water tank filling operation 514 is completed. The determination can be made based on when the water is completely drained from the tub 416. The water draining can be determined to be completed based on a water level sensor in the tub 416, a minimum threshold of water passing through the sump 418 or main pump 426, etc. When the water is completely drained from the tub 416, the electronic device 101 proceeds to operation 518.

In operation 518, the electronic device 101 turns off the main pump 426 and closes the main valve 456. At this point, the tub 416 has been emptied of the water from the prewash phase 202, which is stored in the water tank 448 for the following phase. The main wash phase 204 can follow after the end of the prewash phase 202.

During the main wash phase 204 or any immediately succeeding phase, the water from the prewash phase 202 is stored in the water tank 448. The water in the water tank 448 can have residual heat from the prewash phase 202.

Although FIG. 5 illustrates an example flow chart for a prewash phase 202, various changes may be made to FIG. 5. For example, while shown as a series of steps, various steps in FIG. 5 may overlap, occur in parallel, occur in a different order, or occur any number of times.

Figure 6:
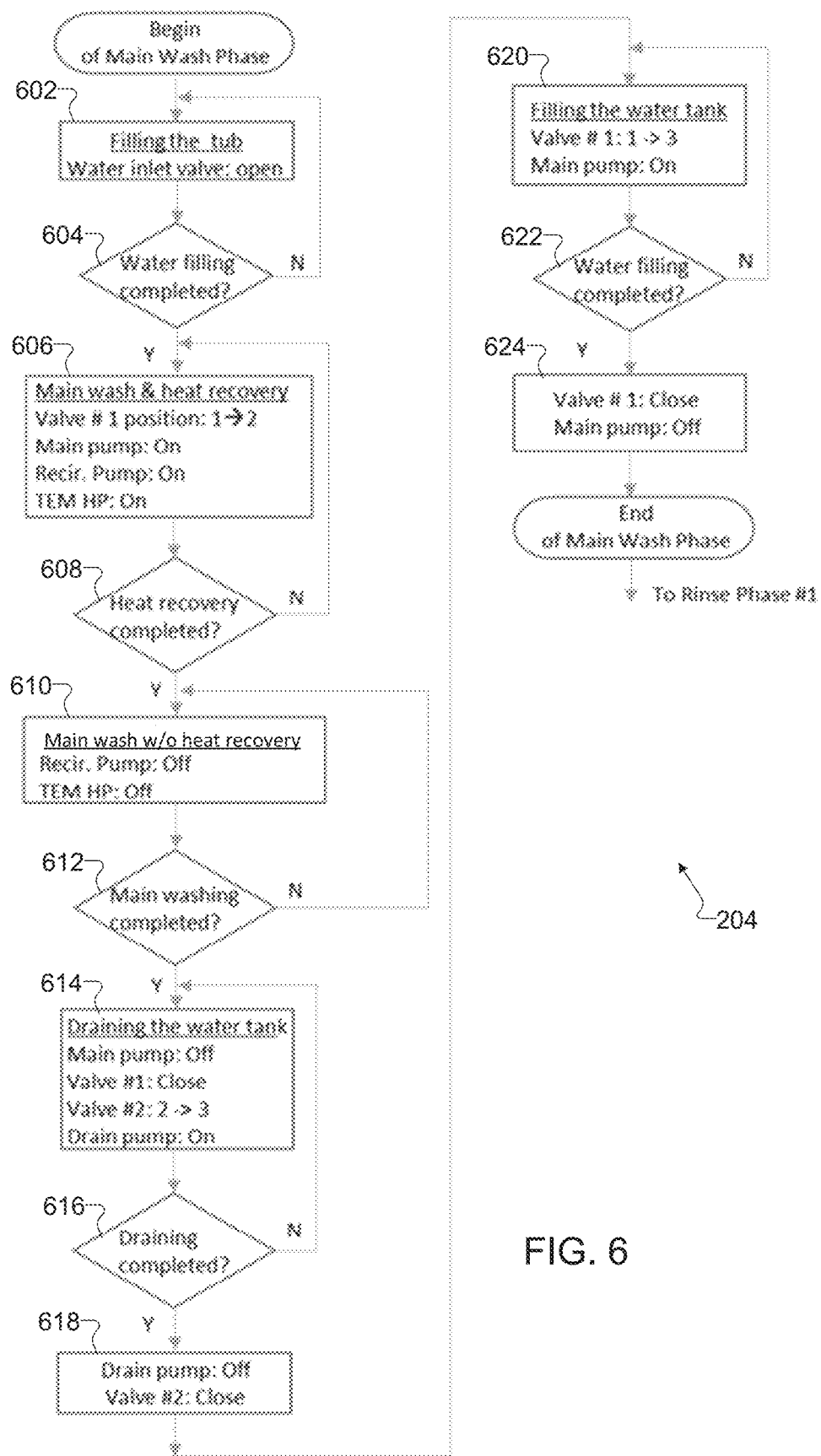
FIG. 6 illustrates an example flow chart for a main wash phase in accordance with this disclosure.

FIG. 6 illustrates an example flow chart for a main wash phase 204 in accordance with this disclosure. Although the main wash phase 204 shown in FIG. 6 is described as being performed using the electronic device 101 shown in FIG. 1 and the dishwashers 400-406 shown in FIGS. 4A-4D, the main wash phase 204 shown in FIG. 6 could be used with any other suitable electronic device and in any suitable dishwasher system without departing from the present disclosure.

In tub filling operation 602, the electronic device 101 can open the water supply valve 424 allowing water to flow through the water supply 422 into the tub 416. An amount of water that is supplied to the tub 416 during the main wash phase 204 can be different from the amount of water supplied to the tub 416 in the prewash phase 202.

In operation 604, the electronic device 101 can determine whether the tub filling operation 602 is completed. The tub 416 is filled with water from the water supply 422 to a suitable level for the main wash phase 204. The level of the water can be determined based on the system inputs and the cycle inputs. When the level of water is not suitable for the main wash phase 204, the electronic device 101 can return to tub filling operation 602. When the level of water is suitable for the main wash phase 204, the electronic device 101 can proceed to operation 606.

The electronic device 101 can close the water supply valve 424 shutting off the flow of water through the water supply 422 in the tub 416. The water supply valve 424 can be closed incrementally at different levels of water to slow the flow of water through the water supply 422 as the level of water in the tub 416 reaches a suitable level for the main wash phase 204.

In heat recovery operation 606, the electronic device 101 operates the main pump 426, the recirculation pump 452, and the TEM 302. The electronic device 101 controls the main valve 456 to direct water from the tub 416 through circulation circuit 430. The electronic device 101 operates the main pump 426 to direct the water drained through the sump 418 through the circulation circuit 430 towards output water channel 308a of the thermoelectric heat pump system 300. The recirculation pump 452 circulates the water stored in the water tank 448 from the prewash phase 202 through the recirculation circuit 450. The water in the recirculation circuit is passed through a supply water channel 308b. The TEM 302 is operated to draw heat from the water passing through the supply water channel 308b to heat the water in the circulation circuit 430 passing through the output water channel 308a. The water passes through the output water channel 308a and along to the sprayer 420. The heated main wash water is sprayed in the interior of the tub 416. The water from the supply water channel 308b is returned to the water tank 448.

In operation 608, the electronic device 101 can determine whether the heat recovery operation 606 of the water from the prewash phase 202 in the water tank 448 has been completed. The determination can be made based on a temperature required for the main wash phase 204. The threshold can be based on reaching a specific temperature, based on a combination of amount of heating time and current heating temperature, or based on an amount of power required for operating the TEM 302, etc. For instance, if a threshold temperature is not reached but an elevated temperature has been maintained over an extended period of time, the electronic device 101 can determine that the heat recovery has been completed. If heat can still be recovered from the water in the water tank 448, the electronic device 101 continues with heat recovery operation 606. When the water recovery is completed, the electronic device 101 proceeds to main wash operation 610.

In main wash operation 610, the main pump 426 operates while the recirculation pump 452 and the TEM 302 do not operate. That is, the electronic device 101 operates the main pump 426, while the recirculation pump 452 and the TEM 302 are not operated. The electronic device 101 controls the main valve 456 to direct water from the tub 416 through circulation circuit 430. The main pump 426 pumps the water drained from the sump 418 through the circulation circuit 430 towards output water channel 308a of the thermoelectric heat pump system 300. The water passes through the output water channel 308a and along to the sprayer 420. The water is sprayed in the interior of the tub 416. The electronic device 101 leaves the recirculation pump 452 and the TEM 302 turned off during the wash operation 610.

In operation 612, the electronic device 101 determines whether the main wash operation 610 is completed. The main wash operation can be schedule based on a time received as a cycle input. When the main wash operation is completed, the electronic device 101 proceeds to operation 516.

In water tank draining operation 614, the electronic device 101 operates the drain pump 428, while the main pump 426 is turned off. The water from the prewash cycle 202 is drained from the water tank 448. The drain pump 428 pulls the water from the water tank 448 through a drain valve 434 to outside the dishwasher 404. The water tank draining operation 614 can begin after the main washing operation 610 is completed or after the heat recovery operation 608 is completed while the main wash operation 610 is occurring.

In operation 616, the electronic device 101 determines whether the water tank draining operation has been completed. Level sensors 180 could be used in the water tank to determine a fill level. Another method to determine the fill of the water tank 448 is to monitor a flow through the drain pump 428.

In operation 618, the electronic device 101 turns the drain pump 428 off. The drain valve 434 is switch to a direct path from the sump 418 to outside of the dishwasher 404.

In water tank filling operation 620, the electronic device 101 fills the water tank 448. The electronic device 101 controls the main valve 456 to direct the water pumped by the main pump 426 from the sump 418 towards the water tank 448 and closes the path to the circulation conduit 430. The main pump 426 remains operating until the water is completely drained from the tub 416.

In operation 622, the electronic device 101 determines whether the water tank filling operation 620 is completed. The determination can be made based on when the water is completely drained from the tub 416. The water draining can be determined to be completed based on a water level sensor in the tub 416, a minimum threshold of water passing through the sump 418 or main pump 426, etc. When the water is completely drained from the tub 416, the electronic device 101 proceeds to operation 624.

In operation 624, the electronic device 101 turns off the main pump 426 and closes the main valve 456. At this point, the tub 416 has been emptied of the water from the prewash phase 202, which is stored in the water tank 448 for the following phase. The first rinse phase 206 can follow the end of the main wash phase 204.

During the first rinse phase 206 or any immediately succeeding phase, the water from the main wash phase 204 is stored in the water tank 448. The water in the water tank 448 can have residual heat from the main wash phase 204.

Although FIG. 6 illustrates an example flow chart for a main wash phase 204, various changes may be made to FIG. 6. For example, while shown as a series of steps, various steps in FIG. 6 may overlap, occur in parallel, occur in a different order, or occur any number of times.

Figure 7:
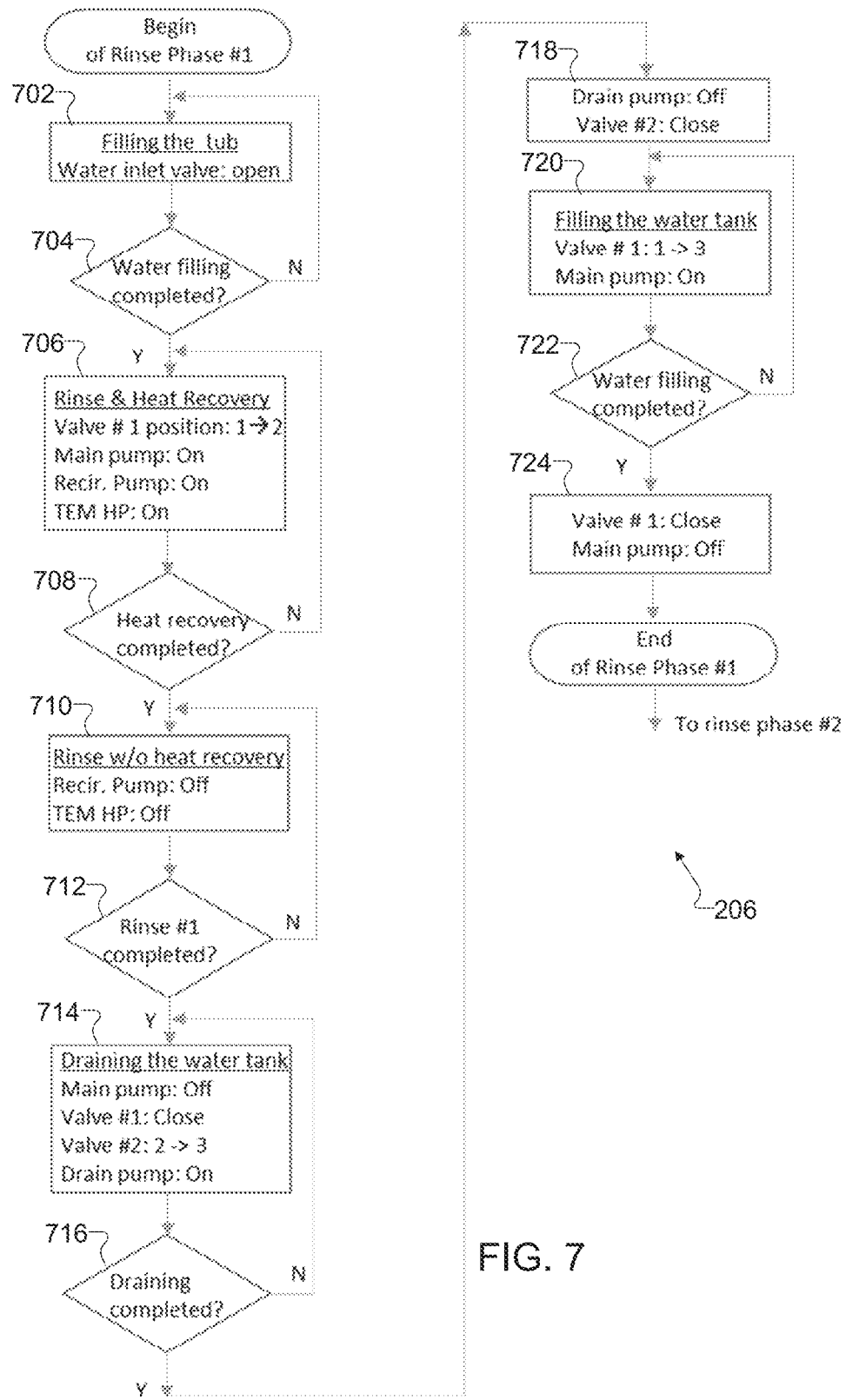
FIG. 7 illustrates an example flow chart for a first rinse phase in accordance with this disclosure.
Figure 8:
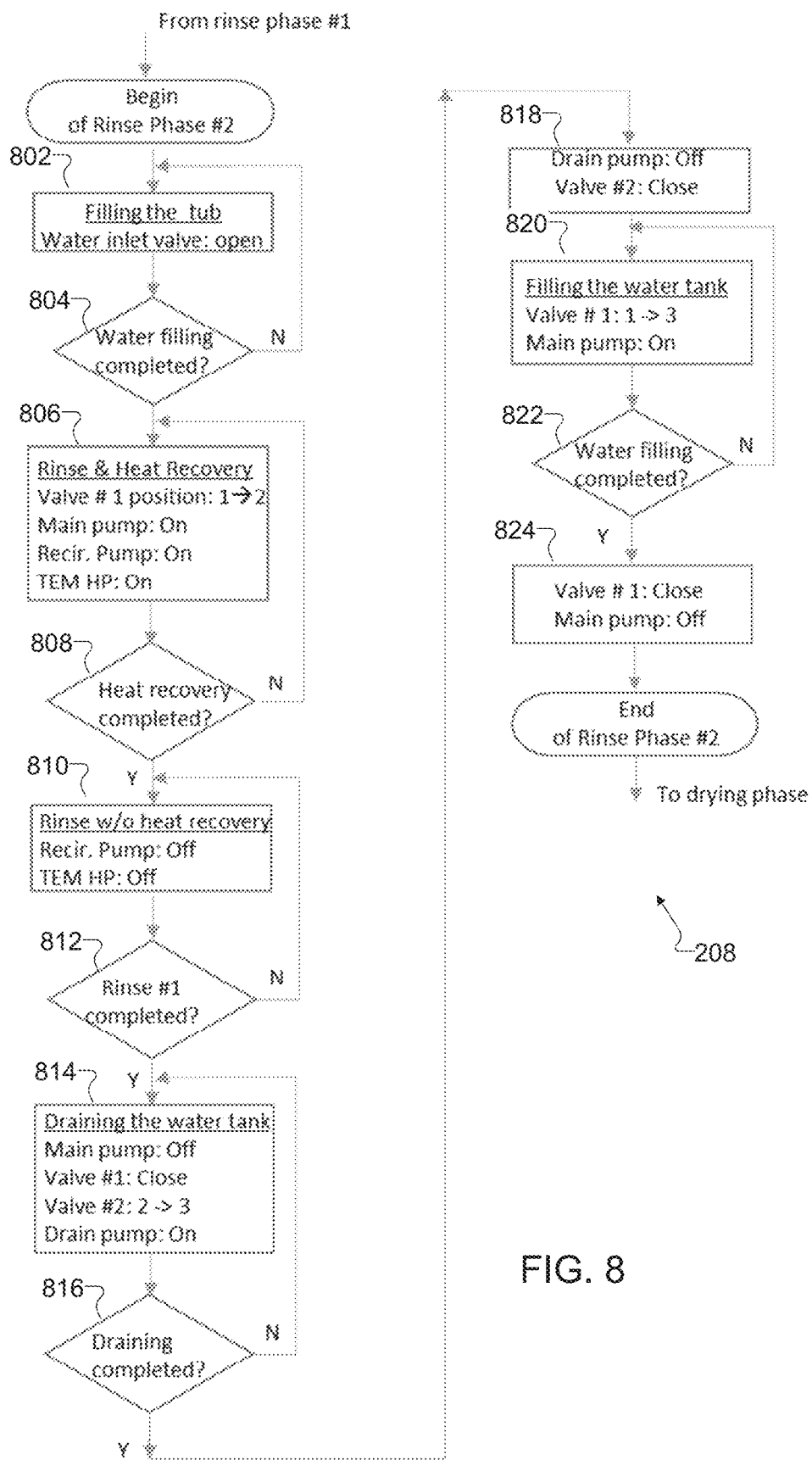
FIG. 8 illustrates an example flow chart for a second rinse phase in accordance with this disclosure.

FIG. 7 illustrates an example flow chart for a first rinse phase 206 in accordance with this disclosure. FIG. 8 illustrates an example flow chart for a second rinse phase 208 in accordance with this disclosure. Although the first rinse phase 206 shown in FIG. 7 and the second rinse phase 208 shown in FIG. 8 are described as being performed using the electronic device 101 shown in FIG. 1 and the dishwashers 400-406 shown in FIGS. 4A-4D, the first rinse phase 206 shown in FIG. 7 and the second rinse phase 208 shown in FIG. 8 could be used with any other suitable electronic device and in any suitable dishwasher system without departing from the present disclosure.

A first rinse phase 206 begins after the main wash phase 204 in completed. The Operations 702-724 of the first rinse phase 206 are similar to the Operations 602-624 of the main wash phase 204, with the exception of first rinse operation 710 and the water used in the water tanks is stored from the main wash phase 204 instead of the prewash phase 202. In the first rinse operation 710, the electronic device 101 can control the main pump 426 to generate a different force from the control of the main pump 426 during the main wash phase 204. The change of force by the main pump 426 alters the pressure of the water exiting the sprayers 420.

A second rinse phase 208 begins after the first rinse phase 206 is completed. The Operations 802-824 of the second rinse phase 208 are also similar to the Operations 702-724 of the first rinse phase 206, with the exception of second rinse operation 810 and the water used in the water tanks is stored from the first rinse phase 206 instead of the main wash phase 204. In the second rinse operation 810, the electronic device 101 can control the main pump 426 to generate a different force from the control of the main pump 426 during the first rinse phase 206. The change of force by the main pump 426 alters the pressure of the water exiting the sprayers 420. After the second rinse phase 208 is completed, the wash cycle proceeds to a drying phase Although FIGS. 7 and 8 illustrate example flow charts for a first rinse phase 206 and a second rinse phase 208, various changes may be made to FIGS. 7 and 8. For example, while shown as a series of steps, various steps in FIGS. 7 and 8 may overlap, occur in parallel, occur in a different order, or occur any number of times.

Figure 9:
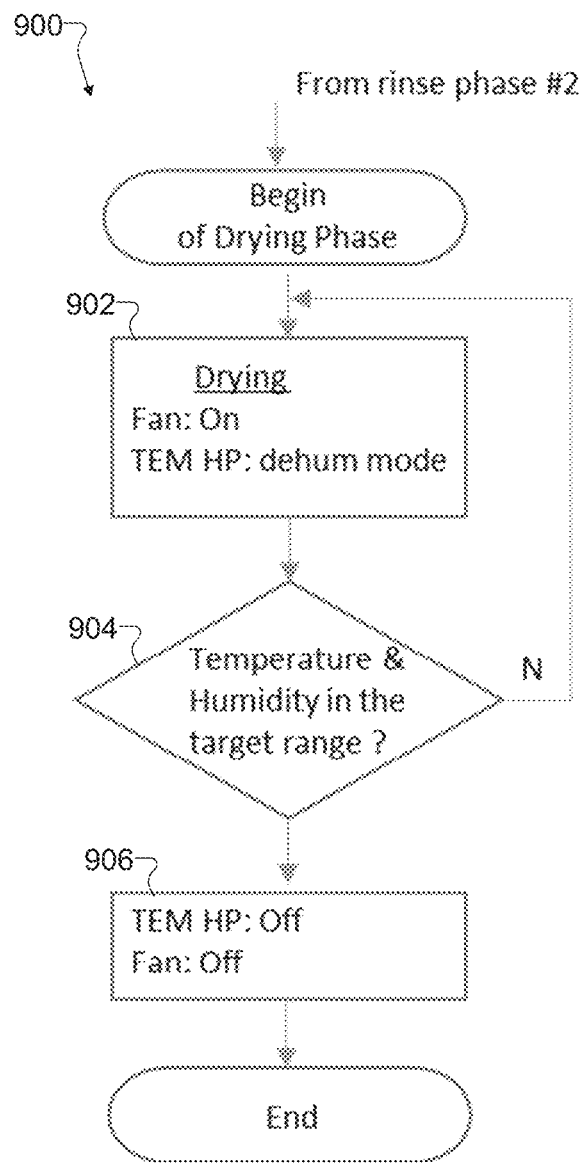
FIG. 9 illustrates an example flow chart for a drying phase in accordance with this disclosure.

FIG. 9 illustrates an example process 900 for a drying phase in accordance with this disclosure. Although the process 900 shown in FIG. 9 is described as being performed using the electronic device 101 shown in FIG. 1 and the dishwashers 400-406 shown in FIGS. 4A-4D, the process 900 could be used by or with any other suitable electronic device and in any suitable dishwasher system without departing from the present disclosure.

In drying operation 902, the electronic device 101 operates the fan 446 and the TEM 302. The fan 446 pulls the air inside of the tub 416 into an air outlet 442 through a dehumidifying circuit 440. The dehumidifying circuit 440 passes the air from the air outlet 442, through supply heat transfer fins 310b and output heat transfer fins 310a. and to an air inlet 444 of the tub 416. The heat in the air is removed as the air passes through the supply heat transfer fins 310b creating a dehumidifying effect and the dehumidified air is heated passing through the output heat transfer fins 310a. Because air has a lower density than liquids, the TEM 302 can operate at a lower power during drying operation 902 than in phases 202-208. Also, water from the second rinse phase 208 could be transferred through the supply water channel 308b for additional heat transfer efficiency of the thermoelectric heat pump system 300 during the drying phase.

In operation 904, the electronic device 101 determines whether the drying operation 902 is completed. Sensors 180 in the tub 416 or dehumidifying circuit 440 are monitored for temperature of humidity within a target range. When the temperature and humidity are within the target range, the electronic device proceeds to shut-down operation 906. In operation 906, the electronic device 101 ends operation of the fan 446 and the TEM 302.

FIG. 9 illustrates an example flow chart for a drying phase 900, various changes may be made to FIG. 9. For example, while shown as a series of steps, various steps in FIG. 9 may overlap, occur in parallel, occur in a different order, or occur any number of times.

Figure 10:
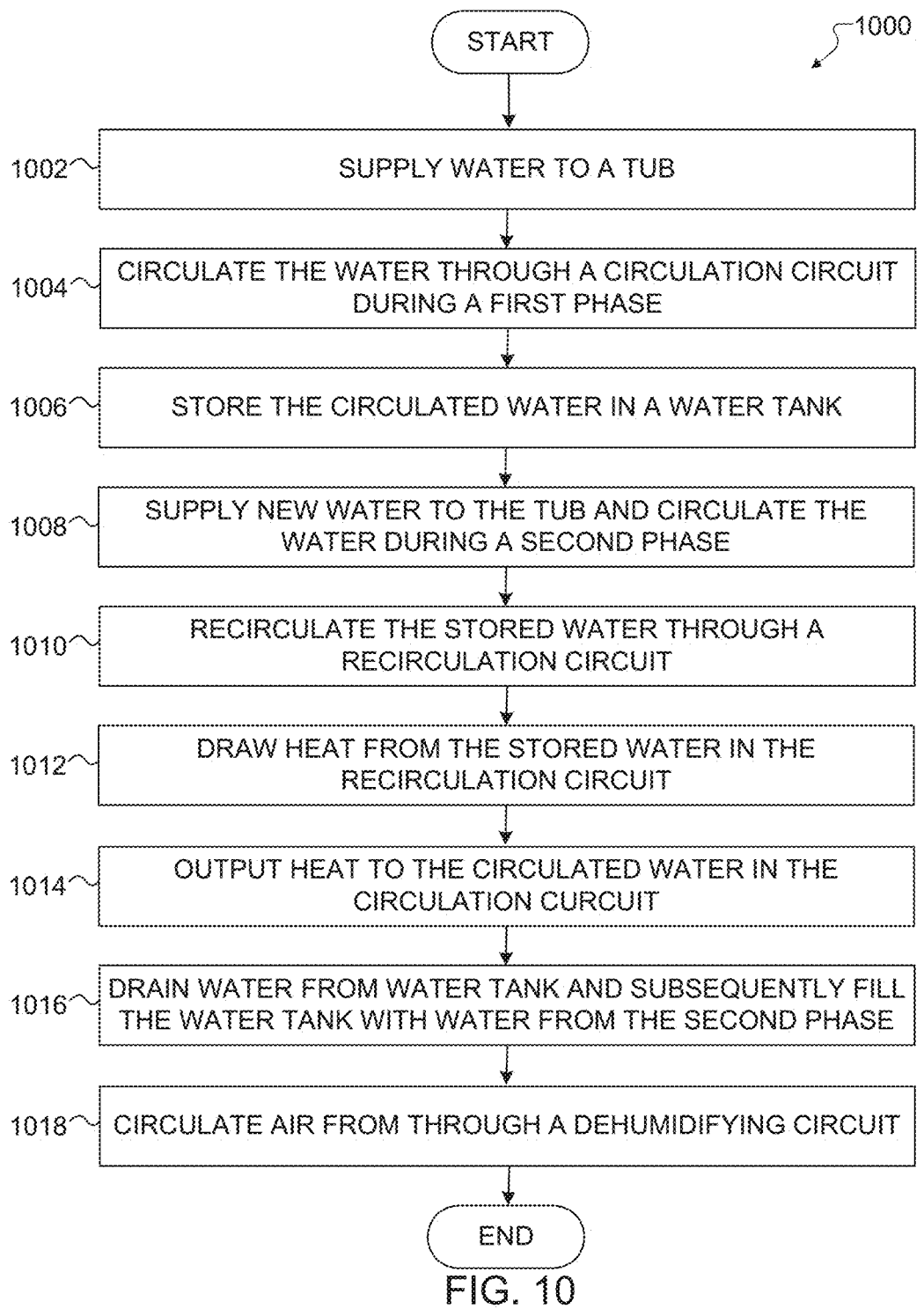
FIG. 10 illustrates an example method for a thermoelectric heat pump recovery and dish drying system for a domestic dishwasher in accordance with this disclosure.

FIG. 10 illustrates an example process 1000 for a thermoelectric module recovery and dish drying system for a domestic dishwasher in accordance with this disclosure. Although the process 1000 shown in FIG. 10 is described as being performed using the electronic device 101 shown in FIG. 1 and the dishwashers 400-406 shown in FIGS. 4A-4D, the process 1000 could be used with or by any other suitable electronic device and in any suitable dishwasher system without departing from the present disclosure.

In operation 1002, the dishwasher 404 supplies water into a tub 416. The water is supplied through a water supply 422 with the flow controlled by a supply valve 424. The water is supplied to a threshold level for the specific washing phase.

In operation 1004, the dishwasher 404 circulates the water through a circulation circuit 430. The circulation circuit 430 extending from a sump 418 to a sprayer 420. The sump 418 drains the water from the tub 416. A main pump 426 controls a flow of the water through a circulation circuit 430 to the sprayer 420. A main valve 456 coupled to the circulation circuit 430 can also control the flow of the water to the sprayer 420. At this time, the TEM 302 does not need to operate.

In operation 1006, the dishwasher 404 stores the circulated water in a water tank 448 on a completion of a first phase. After a phase is completed, the main valve 456 diverts the water from the main pump 426 into a water tank 448. The main pump 426 operates until the tub 416 is emptied of water.

In operation 1008, the dishwasher 404 supplies water into the tub and circulates the water in a second phase. After the water from the previous phase is drained, fresh water is supplied to the tub 416. The fresh water is then circulated by the main pump 426 through the main valve 456 and the output water channel 308a to the sprayer 420.

In operation 1010, the dishwasher 404 recirculates the stored water in the water tank 448 through a recirculation circuit 450. A recirculation pump 452 is operated to circulate the water stored in the water tank 448 through a supply water channel 308b of the thermal heat pump system 412. After passing through the supply water channel 308b, the water is returned to the water tank 448.

In operation 1012, the dishwasher 404 draws heat from the stored water in the water tank from the first phase. Energy is supplied by the power supply 316 to the TEM 302. The supply water channel 308b is coupled to a supply side 320 of the TEM 302. The energy supplied to the TEM 302 causes heat to be drawn from water passing through the supply water channel 308b.

In operation 1014, the dishwasher 404 outputs heat to the circulated water in the circulation circuit during the second phase. The output water channel 308a is coupled to an output side 318 of the TEM 302. The energy supplied to the TEM 302 causes the drawn heat transfer to the water passing through the output water channel 308a.

In operation 1016, the dishwasher 404 drains the water from the water tank 448 and subsequently fill the water tank 448 with the water from the second phase. The drain valve 434 is opened to create a path from the water tank 448 to the drain pump 428. The drain pump 428 discharges the water from the dishwasher 404. Once the water tank 448 is empty, the drain valve 434 is closed and the main valve 456 opens the path from the main pump 426 to the water tank 448.

In operation 1018, the dishwasher 404 circulates air from the tub 416 through a dehumidifying circuit 440. After a final washing phase, a fan 446 is operated to circulate air through the dehumidifying circuit 440, the supply heat transfer fins 310b, and the output heat transfer fins 310a. The TEM 302 causes the supply heat transfer fins 310b to draw heat from the air passing through, which cools and dehumidifies the air. The air then passes through the output heat transfer fins 310a, which the TEM 302 causes the output heat transfer fins 310a to heat the dehumidified air.

Figure 11:
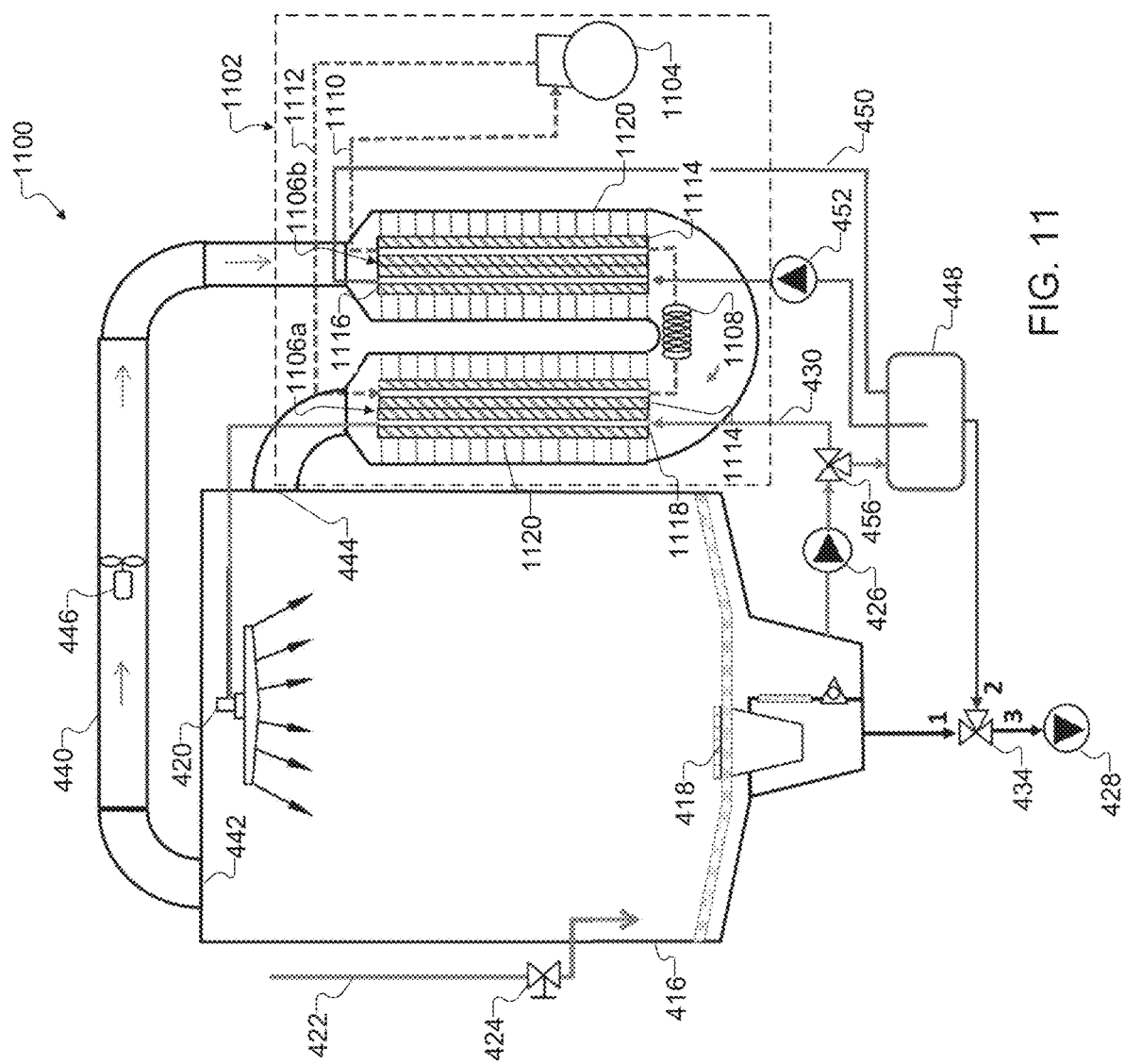
FIG. 11 illustrates an example dishwasher with a compression pump system in accordance with this disclosure.

FIG. 11 illustrates an example process for a thermoelectric module recovery and dish drying system for a domestic dishwasher, various changes may be made to FIG. 11. For example, while shown as a series of steps, various steps in FIG. 11 may overlap, occur in parallel, occur in a different order, or occur any number of times.

FIG. 11 illustrates an example dishwasher 1100 with a compression heat pump system 1102 in accordance with this disclosure. Although the dishwasher 1100 may be described as being controlled using the electronic device 101 of FIG. 1, the dishwasher 1100 may be controlled with any suitable electronic device and be included in any suitable system without departing from the scope of the present disclosure.

As shown in FIG. 11, dishwasher 1100 includes a compression heat pump system 1102, a tub 416, a sump 418, a sprayer 420, a water supply 422, a water supply valve 424, a main pump 426, a drain pump 428, a circulation circuit 430, a main valve 456, a drain valve 434, a dehumidifying circuit 440, a fan 446, water tank 448, a recirculation circuit 450, and recirculation pump 452.

The compression heat pump system 1102 can include a compressor 1104, an output heat exchange 1106a, a supply heat exchange 1106b, a capillary tube 1108, a compressor suction refrigerant circuit 1110, and a compressor discharge refrigerant circuit 1112. The compression heat pump system 1102 can be substituted for any of the above thermoelectric heat pump systems.

The compressor 1104 is coupled to the dishwasher 1100. The compressor 1104 compresses a refrigerant, which increases the temperature of the refrigerant. The compressor 1104 is draws the refrigerant from the compressor suction refrigerant circuit 1110 and outputs the refrigerant to the compressor discharge refrigerant circuit 1112.

The output heat exchange 1106a includes a refrigerant channel 1114 a condenser channel 1118, and a circular fin 1120. The output heat exchange 1106a receives the compressed refrigerant from compressor 1104 through the compressor discharge refrigerant circuit 1112 into the refrigerant channel 1114. The circulation circuit 430 passes water through the condenser channel 1118. Heat from the refrigerant passing through the refrigerant channel 1114 is transferred to the water passing through the condenser channel 1118. Heat from the refrigerant passing through the refrigerant channel 1114 can also be transferred to air passing through the circular fin 1120.

The supply heat exchange 1106b includes a refrigerant channel 1114, an evaporator channel 1116, and a circular fin 1120. The output heat exchange 1106a receives the expanded refrigerant from capillary tube 1108 into the refrigerant channel 1114. The recirculation circuit 430 passes water through the evaporator channel 1116. Heat from the water passing through the evaporator channel 1116 is transferred to the refrigerant passing through the refrigerant channel 430. Heat from the air passing through the circular fin 1120 can also be transferred to the refrigerant passing through the refrigerant channel 430.

The capillary tube 1108 is coupled to the compression heat pumping system 11102 between the output heat exchange 1106a and the supply heat exchange 1106b. The capillary tube 1108 is a tube with a small diameter that creates a pressure drop in the refrigerant and lowers the temperature of the refrigerant. Lowering the temperature in the refrigerant allows heat to be drawn from the water in the recirculation circuit 450 and the dehumidifying circuit 440.

The compressor suction refrigerant circuit 1110 is coupled to the compressor 1104 and the supply heat exchange 1106b. The refrigerant is drawn through the compressor suction refrigerant circuit 1110 by the compressor 1104.

The compressor discharge refrigerant circuit 1112 is coupled to the compressor 1104 and the output heat exchange 1106a. The refrigerant is discharged through the compressor discharge refrigerant circuit 1110 by the compressor 1104.

Although FIG. 11 illustrate example dishwasher 1100 with a compression heat pump system 1102, various changes may be made to FIG. 11. For example, each individual component of the dishwasher 1100 may have any suitable size, shape, and dimensions, and dishwashers 1100 overall may have any suitable size, shape, and dimensions. Also, while specific materials may be described above as being used in the components of dishwasher 1100, the components of dishwasher 1100 may be fabricated from any other suitable materials. In addition, the dishwasher 1100 may include any suitable number of each component shown here.

Figures 12A, 12B:
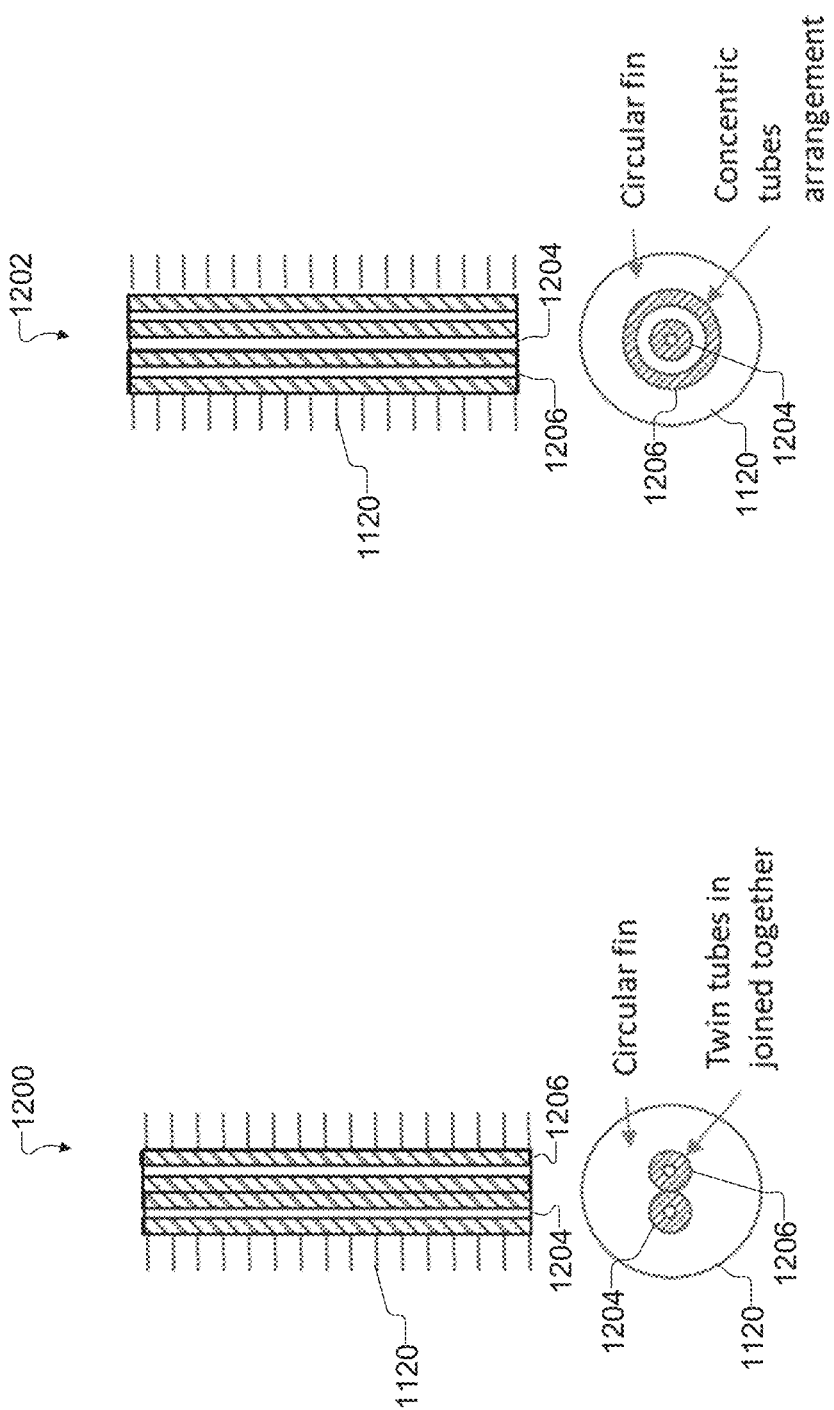
FIGS. 12A and 12B illustrate example heat exchanges for a compression pump system in accordance with this disclosure.

FIGS. 12A and 12B illustrate example heat exchanges 1200, 1202 for a compression pump system in accordance with this disclosure. Although the heat exchanges 1200, 1202 may be described as being implemented in the dishwasher 1100 of FIG. 11, the heat exchanges 1200, 1202 may be controlled with any suitable dishwasher and be included in any suitable system without departing from the scope of the present disclosure.

Heat exchanges 1200 and 1202 each include a first channel 1204 and a second channel 1206 surround by circular fins 1120. Either of the first channel 1204 and the second channel 1206 could represent, a refrigerant channel 1114, an evaporator channel 1116, or a condenser channel 1118. As shown in FIG. 12A, heat exchange 1200 has the first channel 1114 adjacently coupled to the second channel 1116. As shown in FIG. 12B, heat exchange 1202 has the first channel 1204 and the second channel 1206 in a concentric arrangement.

Although FIGS. 12A and 12B illustrate example heat exchanges 1200, 1202 for a compression pump system, various changes may be made to FIGS. 12A and 12B. For example, each individual component of the heat exchanges 1200 may have any suitable size, shape, and dimensions, and heat exchanges 1200 overall may have any suitable size, shape, and dimensions. Also, while specific materials may be described above as being used in the components of heat exchanges 1200, the components of heat exchanges 1200 may be fabricated from any other suitable materials. In addition, the heat exchanges 1200 may include any suitable number of each component shown here.

It should be noted that while various operations are described above as being performed using one or more devices, those operations can be implemented in any suitable manner. For example, each of the functions in the electronic device 101 can be implemented or supported using one or more software applications or other software instructions that are executed by at least one processor 120 of the electronic device 101. In other embodiments, at least some of the functions in the electronic device 101 can be implemented or supported using dedicated hardware components. In general, the operations of a device can be performed using any suitable hardware or any suitable combination of hardware and software/firmware instructions.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A dishwasher including:
   a tub including a sump and a sprayer;
   a water supply coupled to the tub and configured to supply water into the tub;
   a circulation circuit coupled to the sump and the sprayer and configured to circulate the water from the sump to the sprayer;
   a water tank coupled to the circulation circuit and configured to store the water on completion of a first phase; and
   a thermoelectric module system coupled to the circulation circuit and the water tank, the thermoelectric module system including a thermoelectric module structured with:
   a supply side coupled to the water tank and configured to draw heat from the stored water in the water tank from the first phase;
   an output side coupled to the circulation circuit and configured to output the heat to the circulated water in the circulation circuit for a second phase; and
   an output heat transfer block attached to the output side and structured to interface with the circulated water in the circulation circuit.

2. The dishwasher of claim 1, wherein the thermoelectric module system further includes:
   a supply heat transfer block attached to the supply side and structured to interface with the stored water in the water tank.

3. The dishwasher of claim 2, wherein the water tank includes a recirculation circuit configured to recirculate the stored water through the supply heat transfer block.

4. The dishwasher of claim 2, further comprising:
   a dehumidifying circuit coupled to the tub and configured to circulate air from the tub through the supply heat transfer block, the output heat transfer block, and back into the tub.

5. The dishwasher of claim 4, wherein:
   the supply heat transfer block includes supply heat transfer fins configured to remove heat in the air of the dehumidifying circuit; and
   the output heat transfer block includes output heat transfer fins configured to add the removed heat to the air of the dehumidifying circuit.

6. The dishwasher of claim 1, further comprising:
   a three-way main valve coupled to the circulation circuit and configured to divert the water to the water tank.

7. The dishwasher of claim 1, further comprising:
   a three-way drain valve coupled to an output of the sump and configured to receive the water from the water tank.

8. A method comprising:
   supplying, using a water supply coupled to a tub of a dishwasher, water into the tub, wherein the tub includes a sump and a sprayer;
   circulating, using a circulation circuit coupled to the sump and the sprayer, the water from the sump to the sprayer;
   storing, using a water tank coupled to the circulation circuit, the circulated water from the circulation circuit on completion of a first phase;
   drawing heat, using a supply side of a thermoelectric module system coupled to the circulation circuit and the water tank, from the stored water in the water tank from the first phase; and
   outputting, using an output side of the thermoelectric module system, the heat to the circulated water in the circulation circuit through an output heat transfer block for a second phase, wherein the output heat transfer block is structured to interface with the circulated water in the circulation circuit.

9. The method of claim 8, wherein the heat is drawn through a supply heat transfer block attached to the supply side of the thermoelectric module, the supply heat transfer block structured to interface with the stored water in the water tank.

10. The method of claim 9, further comprising:
    recirculating, using a recirculation circuit coupled to the water tank, the stored water through the supply heat transfer block.

11. The method of claim 9, further comprising:
    circulating, using a dehumidifying circuit coupled to the tub, air from the tub through the supply heat transfer block, the output heat transfer block, and back into the tub.

12. The method of claim 11, further comprising at least one of:
    removing the heat in the air of the dehumidifying circuit using supply heat transfer fins of the supply heat transfer block; and
    adding the removed heat to the air of the dehumidifying circuit using output heat transfer fins of the output heat transfer block.

13. The method of claim 8, further comprising:
    diverting the water to the water tank using a three-way main valve coupled to the circulation circuit.

14. The method of claim 8, further comprising:
receiving the water from the water tank using a three-way drain valve coupled to an output of the sump.

15. A thermoelectric module system for a dishwasher, the thermoelectric module system including:
a water tank coupled to a circulation circuit of the dishwasher and configured to store water on completion of a first phase; and
a thermoelectric module structured with:
supply side coupled to the water tank and configured to draw heat from the stored water in the water tank from the first phase;
an output side coupled to the circulation circuit and configured to output the heat to circulated water in the circulation circuit for a second phase; and
an output heat transfer block attached to the output side and structured to interface with the circulated water in the circulation circuit.

16. The thermoelectric module system of claim 15, wherein the thermoelectric module system further includes:
a supply heat transfer block attached to the supply side and structured to interface with the stored water in the water tank.

17. The thermoelectric module system of claim 16, wherein the water tank includes a recirculation circuit configured to recirculate the stored water through the supply heat transfer block.

18. The thermoelectric module system of claim 16, further comprising:
a dehumidifying circuit configured to circulate air from a tub through the supply heat transfer block, the output heat transfer block, and back into the tub.

19. The thermoelectric module system of claim 18, wherein:
the supply heat transfer block includes supply heat transfer fins configured to remove heat in the air of the dehumidifying circuit; and
the output heat transfer block includes output heat transfer fins configured to add the removed heat to the air of the dehumidifying circuit.

20. The thermoelectric module system of claim 16, wherein the supply heat transfer block includes supply heat transfer fins extending into the water tank.

\* \* \* \* \*